Dec. 16, 1952 G. A. THOMAS 2,621,574
ROCKING AXLE TRACTOR WITH HYDRAULIC LIFT
Filed April 6, 1950 2 SHEETS—SHEET 1
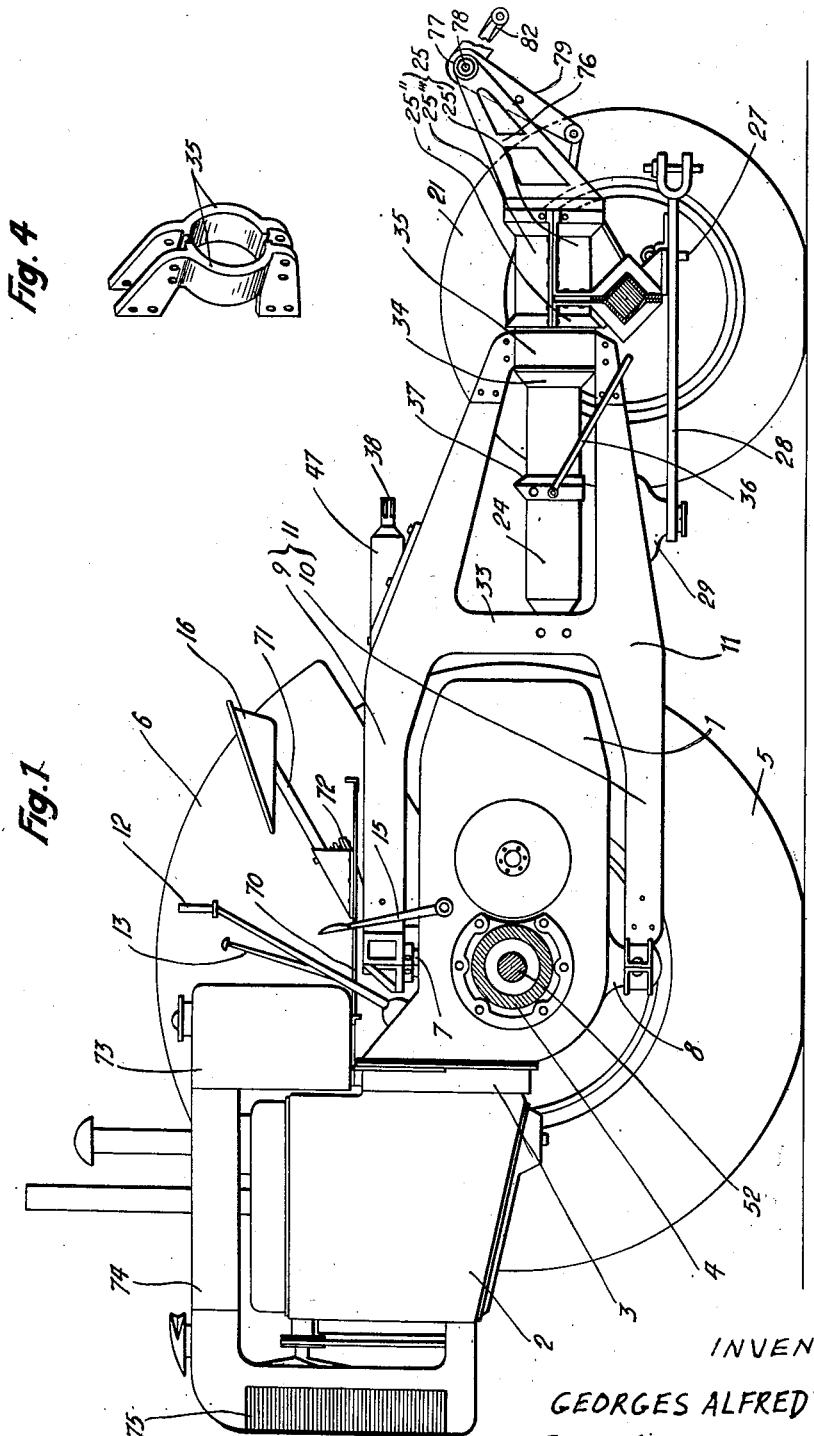
INVENTOR
GEORGES ALFRED THOMAS
BY
ATTORNEY Dec. 16, 1952 G. A. THOMAS 2,621,574
ROCKING AXLE TRACTOR WITH HYDRAULIC LIFT
Filed April 6, 1950 2 SHEETS—SHEET 2
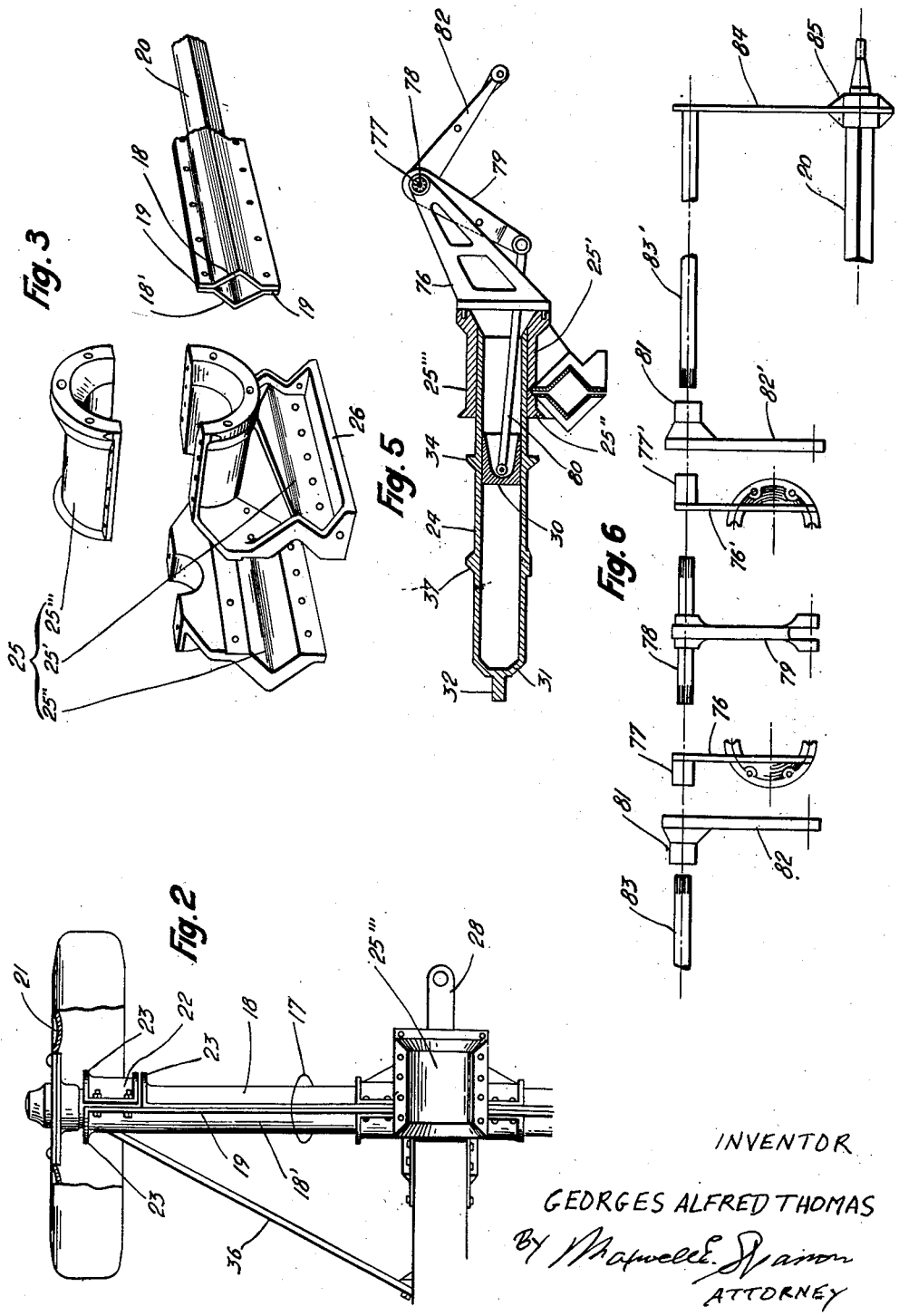
INVENTOR
GEORGES ALFRED THOMAS
By Maxwell E. Sparrow
ATTORNEY Patented Dec. 16, 1952

2,621,574

UNITED STATES PATENT OFFICE 2,621,574

ROCKING AXLE TRACTOR WITH HYDRAULIC LIFT

Georges Alfred Thomas, Paris, France

Application April 6, 1950, Serial No. 154,229
In France October 26, 1945

3 Claims. (Cl. 97—50)

The present invention relates to tractors comprising a driving unit with two driving wheels and on which are located the engine and its accessories, the gears transmitting power to both driving wheels, the change speed gear, the brakes, the steering control means and the driver's seat, said unit swinging about a substantially vertical axis on the two front members of a connector frame the rear end of which is connected with a rear train so as to rock about a longitudinal axis.

A tractor of the above type generally comprises a jack for the lifting of the front part of trailers or of farm implements mounted directly on the rear of the frame or carried by it. The location of said jack constitutes a problem which has never been solved in a practical manner.

The present invention has for its object to provide for a tractor construction wherein the lifting jack simultaneously constitutes the pivoting shaft of the rear train of the tractor or else is incorporated in said shaft that is hollow.

Another object of my invention is to provide for a tractor construction having a jack adapted for moving farm implements distributed along the rear train of the tractor, however the angular position of said train may be.

Other features and characteristics of this tractor will appear in the course of the following detailed description based on the accompanying drawings on which an example of the tractor according to my invention has been schematically shown and it is not a limitative example.

Fig. 1 is a side elevation view of the tractor, some parts being broken away.

Fig. 2 is a plan view of a portion of the rear train.

Fig. 3 is a perspective view of certain separated elements of the member for connecting the rear frame to the hollow shaft.

Fig. 4 is a perspective view of the two end pieces closing the rear of the connector frame.

Fig. 5 is a schematic longitudinal cross-section of the hollow shaft of the rear frame or train.

Fig. 6 is a rear view of certain separated parts of the lifting device for farm implements that may be mounted on the rear frame.

As it can be seen in the accompanying drawings, the engine and the housing enclosing the transmission members respectively overhang the front and the rear of the driving axle.

The assembly of the different housings is preferably accomplished with bolts and studs with the interposition of appropriate seal joints.

The main housing 1 encloses the transmission members including the gear box, the differential, the steering mechanism, the driving mechanism and the pump giving the pressure for the hydraulic lifting jack which will be described hereinafter.

On the main housing 1 are mounted, in the front, the engine 2 with the flywheel housing 3 (including the engine clutch) and, to the right and the left, the axle housing 4 enclosing two half shafts 52 on the free ends of which are splined two large diameter wheels 5 protected by mud guards 6 attached to the axle housing 4.

The upper and lower portions of the main housing 1 include respectively two pivots 7 and 8 upon which are articulated the upper member 9 and the lower member 10 of the connector frame 11.

Attached to the housing 1 are steering levers 12, a change gear control lever 13, a power take-off control lever, a jack pump control lever, a brake pedal and an engine-clutch pedal 15, the driver's seat 16 and the fuel tank 73.

The rear end of the tractor which is especially designed for agricultural purposes, includes a housing 17 into which are slidingly mounted two half axles 20 for the rear wheels 21 in order to allow the change of the width of the track over a wide range.

Said housing consists of strong pieces and strong bearing supports may be put along its whole length (even when the track width is at its maximum) for any implements that it may be desired to utilize on it. Therefore it is possible to attach quickly to said frame any usual farm implement to which it serves as axle frame, thus giving to such implements (without any additional weight) the advantages of its wheels, its rigidity, its sturdiness and a strong hydraulic jack forming one piece with it which will follow all its rocking motions.

The rear axle frame can be built by assembling parts and welding them together. In a preferred embodiment of the invention, such frame comprises two side members 18, 18' in pressed steel of V-shape with welded or riveted side flanges which form stiffening ridges 19, set vertically to increase the deflective strength.

The hollow, a square section for example, formed by the members 18 and 18' receives two steel half axles 20 also of square section as shown in Fig. 3.

The outer ends of the half axles 20 are turned to receive the bearings for the rear wheels 21. These axles 20 which regulate the width of the track by sliding in the rear axle frame, are maintained at the desired distance by the following disposition of the side member ends; the side member 18' is a few centimeters overlapping the side member 18 at both ends. On the side flanges of each overlapping portion of the side member 18' is bolted a cap 22 of the same cross-section and suitably stiffened by transverse webs. The side members 18, 18' are also reinforced by transverse webs 23. It can be seen that the square-shaped axles 20 can be made fast in the desired position by tightening the caps 22 with the lower and upper bolts.

The upper and lower side flanges 19 are perforated so as to give many attachment points for the different farm implements.

In the middle of the side members 18—18' at right angles to and on top of them is placed the hollow rear frame shaft 24 which permits the pivoting, in a vertical plane, of the rear axle in relation to the connector frame. This shaft 24, which can rotate in the rear portion of the connector frame and which slightly projects beyond the rear of the said frame, forms also the cylinder for the lifting jack which will be dealt with below. The assembly of the rear frame with the hollow shaft 24 is preferably realized with heavy castings 25 which fit the outside contour of the members 18, 18' and the hollow shaft 24 which must be assembled and which are shown in detail in Fig. 3. Such parts separately designated as 25', 25" and 25''' are bolted together so as to constitute a rigid block which is the head of the rear frame. The rear lower part 25' is provided at its base with a portion 26 of angle shape which is reinforced by fillets and may receive an iron rail 27 capable of guiding a swivelling draw-bar 28 pivoted to a point 29 on the lower part of the connector frame 11.

As has been mentioned heretofore, the shaft 24 is used also as a hydraulic jack cylinder and, to that effect, is bored accurately to receive a piston 30 (Fig. 5) which can be actuated by hydraulic pressure (or pneumatic, also by inlet manifold vacuum).

The hollow shaft 24 is blanked off at the front end by a head 31 provided with a central stud 32 rotating in a corresponding bearing forming part of the vertical member 33 of the connector frame 11. At a suitable point on its length, the hollow shaft 24 is shouldered at 34 bearing on the inside of a bearing constituted with two symmetrical pieces 35 forming the assembly piece of the rear of the frame 11 (see Figs. 1 and 4). Finally two strut rods 36 are attached, at the one end, to the side of the ends of the members 18' and, at the other end, to the hollow shaft 24, on a shoulder 37 provided for that purpose; such strut rods form a triangle with the rear axle frame, thus stiffening it materially.

As has been explained above, the driving and steering unit and the rear axle frame are connected and articulated to one another by frame 11 which includes an upper side member 9 and a lower member 10 preferably of U cross-section and with their rear ends forming a triangle the apex of which is formed by the parts 35 described above, such parts being fixed together by bolts and fitted over the sides of the U of the members 9 and 10 so as to form a bearing suitably bored to receive the hollow shaft 24. Between the apex of the triangular connector frame and the front ends of members 9 and 10 is the vertical cross-member 33 from where the members 9 and 10 are curved to become practically parallel and to form the two branches of a yoke.

Between the cross-member 33 and its front end, both members 9 and 10 have a box shaped section obtained by welding on said members sheet steel plates giving great rigidity to the frame. At the pivoting point 7 and 8, the ends of said members are provided with bearings each having a cap.

It may be noted that the axis of the hollow shaft 24 is practically at right angles to the axis of the bearings provided at the front ends of members 9 and 10.

The upper member 9 of the frame is constructed to be used for housing the power take-off shaft 38 which rotates in a bearing 47.

A protecting partition 70 Fig. 1 made of sheet steel stiffened by pressed in or added webs is attached above the housing 1 to keep the operator's feet away from the upper member 9.

The partition 70 supports, as can be seen in Fig. 1, the driver's seat 16 located at the end of a support 71 resting on a spring 72 by its lower end. In front of the partition 70 and on top of the engine clutch are two angle irons supporting the fuel tank 73. A sheet steel bonnet 74 connects the fuel tank to the radiator shield 75 bolted to the engine front through supports provided for that purpose.

The hollow shaft 24 used simultaneously as the jack cylinder can be used for many purposes. It can particularly be used for the lifting of farm implements mounted directly on the rear of the frame or carried by it. Such an implement control is shown schematically in Figs. 5 and 6. Two arms or supports 76 and 76' are bolted on the casting 25 locked on the outer end of the hollow shaft 24, such supports 76 and 77' being provided at their upper ends with two bearings 77 and 77' in which is journalled a transverse shaft 78 on which is keyed a lever 79, the lower end of which is connected to the connecting rod 80 of the jack piston 30. The splined ends of the shaft 78 extending beyond bearings 77 and 77' are engaged in the splined bore of two hubs 81 connected firmly to lifting levers 82 and 82'. The hubs 81 and 81' are of such dimensions that, after their engagement on the splined ends of shaft 78, there is still enough splined length to receive the splined end of auxiliary shafts 83 and 83' that are detachable and interchangeable and which can be supported by brackets 84 fixed on the half axle 20 by means of flanges 85. The shafts 83 and 83' may have one or several lifting levers.

The ends of the levers 82 and 82' are connected to the implements to be lifted through links or any other adequate means.

It must be noted that the pipe (not shown) from the jack to the pump supplying the pressure includes two flexible portions viz. one close to the jack (that is close to the articulation axis of the rear train) and the other, near one of the pivots (upper or lower) of the connector frame.

The pump which is used is preferably of a continuous output type so that the jack is controlled only by the opening or the closing of the oil line.

The lifting of very heavy implements does not raise the nose of the machine. By having the articulation axis near the middle of the front axle, it is possible to handle and to steer the tractor very easily even with the heaviest pull.

What I claim is:

1. In a tractor having separate front and rear parts; the combination of a cylindrical member fixed to the rear part of the tractor, longitudinally extending bearing means on the front part of the tractor and receiving said cylindrical member so that the latter provides a longitudinal pivoting axis for swinging of the rear part relative to the front part, said cylindrical member having a central longitudinal bore concentric with said pivoting axis and forming a jack cylinder, and a jack piston movable in said bore so that the jack piston is always positioned in said axis without regard to the relative angular positions of the front and rear tractor parts.

2. In a tractor having separate front and rear parts; the combination of a jack cylinder having a longitudinal bore therein and formed with an external journal surface concentric with said bore, means for securing said jack cylinder on one of the tractor parts, longitudinal bearing means on the other of the tractor parts and formed to rotatably receive said journal surface of the jack cylinder so that the front and rear parts of the tractor are pivotally connected together for relative swinging about a longitudinal axis concentric with said bore, and a jack piston movable linearly in said bore so that said piston is always disposed in the longitudinal axis about which the front and rear parts of the tractor are relatively swingable.

3. In a tractor having separate front and rear parts; the combination of a jack cylinder having a longitudinal bore therein and formed with an external bearing surface concentric with said bore, means for securing said jack cylinder on the rear tractor part, longitudinal bearing means on the front tractor part operative to receive said bearing surface of the jack cylinder so that the front and rear parts of the tractor are pivotally connected for relative swinging about a longitudinal axis concentric with said bore, a jack piston movable linearly in said bore so that said piston is always disposed in the longitudinal axis about which the front and rear parts of the tractor are relatively swingable, lifting means pivotally mounted on the rear part of the tractor, and transmission means operatively connecting said piston to said lifting means.

GEORGES ALFRED THOMAS.

REFERENCES CITED

The following references are of record in the file of this patent:

UNITED STATES PATENTS

| Number | Name | Date |
|---|---|---|
| 1,340,169 | Jessen | May 18, 1920 |
| 2,375,970 | Williams | May 15, 1945 |
| 2,496,474 | Hyman | Feb. 7, 1950 |